United States Patent
Albrecht et al.

(10) Patent No.: US 11,019,369 B2
(45) Date of Patent: **\*May 25, 2021**

(54) SUPPLEMENTAL AUDIO CONTENT FOR GROUP COMMUNICATIONS

(71) Applicant: Orion Labs, San Francisco, CA (US)

(72) Inventors: Greg Albrecht, San Francisco, CA (US); Jesse Robbins, San Francisco, CA (US); Ellen Juhlin, San Francisco, CA (US)

(73) Assignee: Orion Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,198

(22) Filed: Apr. 25, 2019

(65) Prior Publication Data

US 2020/0120365 A1     Apr. 16, 2020

Related U.S. Application Data

(63) Continuation of application No. 15/615,932, filed on Jun. 7, 2017, now Pat. No. 10,321,166.

(60) Provisional application No. 62/346,660, filed on Jun. 7, 2016.

(51) Int. Cl.
| | |
|---|---|
| *H04N 21/233* | (2011.01) |
| *G06F 3/16* | (2006.01) |
| *G06F 16/632* | (2019.01) |
| *G06F 16/635* | (2019.01) |
| *G10L 17/00* | (2013.01) |
| *H04L 29/06* | (2006.01) |
| *H04L 29/08* | (2006.01) |

(52) U.S. Cl.
CPC .......... *H04N 21/233* (2013.01); *G06F 3/165* (2013.01); *G06F 16/632* (2019.01); *G06F 16/635* (2019.01); *G10L 17/00* (2013.01); *H04L 65/4061* (2013.01); *H04L 67/04* (2013.01)

(58) Field of Classification Search
CPC ..... H04N 21/233; G06F 3/165; G06F 16/632; G06F 16/635; G10L 17/005; H04L 65/4061; H04L 67/04
See application file for complete search history.

(56) References Cited

U.S. PATENT DOCUMENTS

| | | |
|---|---|---|
| 9,154,535 B1 | 10/2015 | Harris |
| 9,219,744 B2 | 12/2015 | Baliga et al. |
| 2002/0087330 A1 | 7/2002 | Lee et al. |
| 2003/0093480 A1 | 5/2003 | Lagarde et al. |

(Continued)

*Primary Examiner* — Dominic E Rego (57) ABSTRACT

Systems, methods, software and apparatus enable providing supplemental audio content to members of a communication group via a group communication service that manages the multiple member user nodes' transmission and receipt of communications between and among the member user nodes. A request for audio content (e.g., from the communication group or a member user node) causes the group communication service to launch a bot node member to locate and deliver the requested audio content. The audio content can be merged with user node communications (e.g., as transmission packets or as streaming audio content). In some implementations each user node includes a wearable push-to-talk end user device linked to a communication device executing a communication application connected to the group communication service.

20 Claims, 9 Drawing Sheets

(56) References Cited

U.S. PATENT DOCUMENTS

| | | | |
|---|---|---|---|
| 2004/0057405 A1* | 3/2004 | Black | H04N 21/6405 370/335 |
| 2004/0205772 A1* | 10/2004 | Uszok | H04L 29/06 719/317 |
| 2007/0116224 A1* | 5/2007 | Burke | H04L 29/06027 379/201.12 |
| 2007/0173273 A1* | 7/2007 | Gogic | H04B 7/026 455/518 |
| 2008/0021903 A1* | 1/2008 | Singhal | G06F 16/9535 |
| 2008/0171567 A1 | 7/2008 | Kossi et al. | |
| 2009/0305662 A1* | 12/2009 | Ala-Luukko | H04L 65/4061 455/406 |
| 2010/0049524 A1 | 2/2010 | Ho | |
| 2011/0055901 A1 | 3/2011 | Karaoguz et al. | |
| 2012/0042263 A1* | 2/2012 | Rapaport | G06Q 50/01 715/753 |
| 2012/0192252 A1* | 7/2012 | Kuo | H04L 65/1069 726/4 |
| 2012/0221639 A1 | 8/2012 | Mallet et al. | |
| 2013/0122849 A1 | 5/2013 | Doezema et al. | |
| 2014/0087685 A1 | 3/2014 | Kellond et al. | |
| 2014/0116085 A1 | 5/2014 | Lam | |
| 2014/0280454 A1 | 9/2014 | Medard et al. | |
| 2015/0006698 A1* | 1/2015 | Aono | H04L 41/0886 709/223 |
| 2015/0215747 A1* | 7/2015 | Kemmerer, Jr. | H04W 4/08 455/518 |
| 2015/0244720 A1* | 8/2015 | Suh | H04L 63/065 726/4 |
| 2015/0265313 A1* | 9/2015 | Wong | A61B 17/62 606/56 |
| 2016/0043975 A1* | 2/2016 | Park | H04L 67/325 709/206 |
| 2016/0044322 A1 | 2/2016 | Hochberg et al. | |
| 2016/0054130 A1 | 2/2016 | Marimuthu | |
| 2016/0125460 A1 | 5/2016 | Zellner et al. | |
| 2016/0173370 A1* | 6/2016 | Chiba | H04L 45/64 370/390 |
| 2016/0173960 A1 | 6/2016 | Snibbe et al. | |
| 2017/0124853 A1 | 5/2017 | Mehta et al. | |
| 2017/0127417 A1 | 5/2017 | Anderoli-Fang et al. | |
| 2017/0289070 A1 | 10/2017 | Plumb et al. | |
| 2017/0309277 A1 | 10/2017 | Wlodkowski et al. | |

* cited by examiner

SUPPLEMENTAL AUDIO CONTENT FOR GROUP COMMUNICATIONS

RELATED APPLICATIONS

This application is a Continuation of, and claims priority to U.S. patent application Ser. No. 15/615,932, filed Jun. 7, 2017, entitled "SUPPLEMENTAL AUDIO CONTENT FOR GROUP COMMUNICATIONS," and also hereby claims the benefit of and priority to U.S. Provisional Patent Application 62/346,660, filed Jun. 7, 2016, entitled "SUPPLEMENTAL AUDIO CONTENT FOR GROUP COMMUNICATIONS," each of which is hereby incorporated by reference in their entirety.

TECHNICAL FIELD

Aspects of the disclosure are related to distributed group communication and in particular to devices and applications for group communication.

TECHNICAL BACKGROUND

In some systems, a group management system facilitates secure communications between multiple user nodes in a distributed communication environment. Communications among members of a defined group can be enabled using distributed end user devices operating in the networked user nodes, where multiple user nodes each include an intermediate communication device that establishes a communication channel with another intermediate communication device in another user node. The intermediate communication devices (e.g., cellphones, smartphones, laptop computers, tablets and others) are linked to a communication network and the group management system, which implements communications between user devices (via a communication application in each intermediate communication device) in the defined group of user nodes.

The group management system processes communication messages transmitted by a group member user node to determine its identity, thereafter identifying one or more active communication groups with which the first user node is affiliated. In connection with at least one of the identified active communication groups, the group management system relays the group member user node's transmitted communication messages to active recipient nodes affiliated with the group. Various groups may use such systems for realtime communication among the various groups' members. In some cases it may be desirable to deliver supplemental audio to some or all group members as part of the group's active communications.

Overview

Implementations providing supplemental audio content to members of a communication group via a group communication service include systems, methods, and software to supplement communications between the group's member user nodes with requested audio content. The group communication service manages each communication group which can include multiple member user nodes transmitting and receiving communications between the member user nodes via the group communication service. A group member or the group collectively requests audio content. The group communication service then launches a bot node that is configured to be a member of the communication group and is further configured to locate and deliver the requested audio content to either the group communication service or to member user nodes directly. In some implementations the supplemental audio content is merged with the communications that are transmitted and received between group member user nodes. In some implementations the merger of audio content and user communications is accomplished by treating the supplemental audio content as another user node in the communication group (e.g., a one-way communication node).

In some implementations each member user node includes an end user device wirelessly linked to a communication network that is executed on a communication device connected to the group communication service. In other implementations each node is a communication application executing on a communication device. A user interface can receive user input to configure the request and delivery of the supplemental audio content.

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
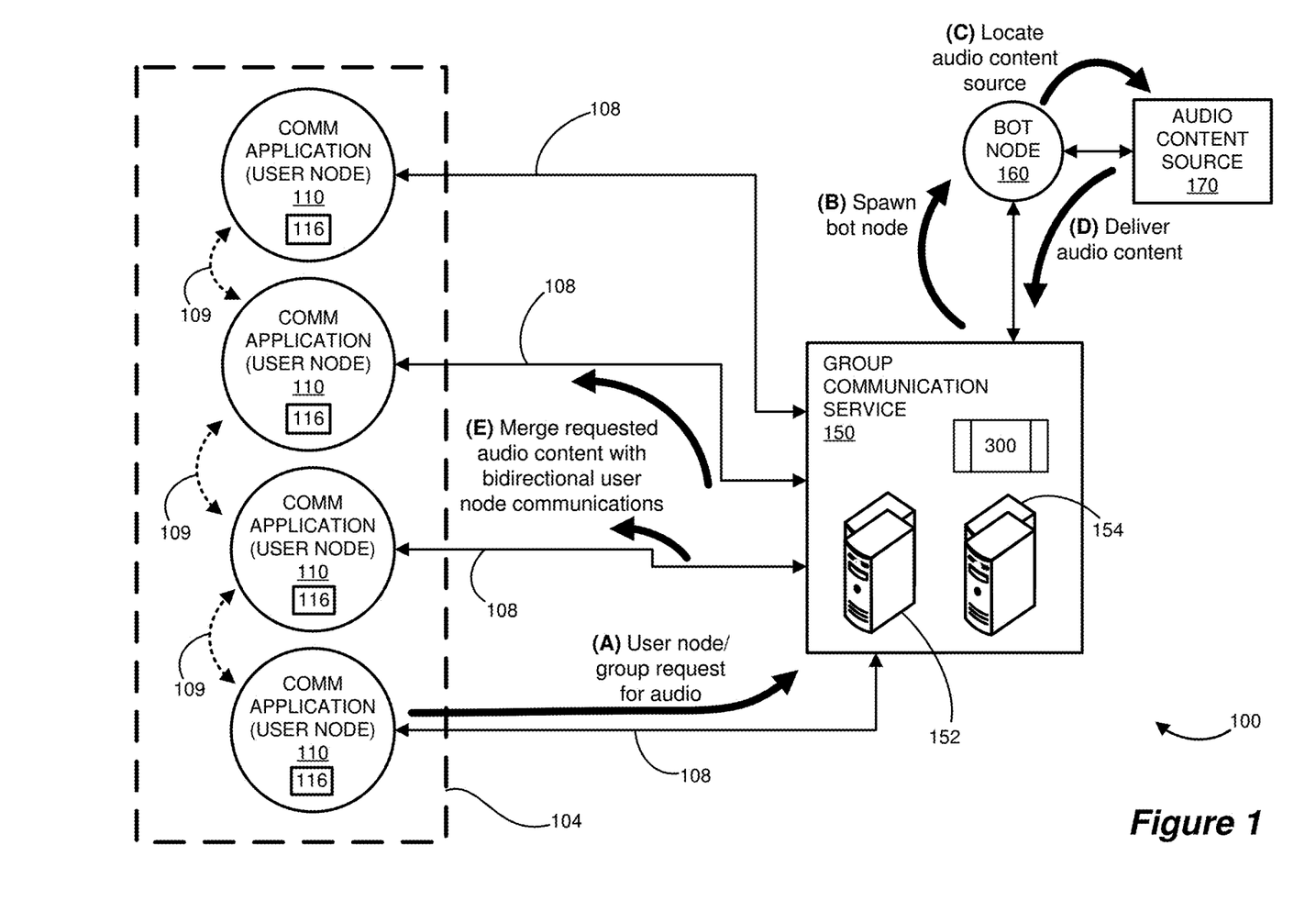
FIG. 1 illustrates one or more exemplary systems configured to provide supplemental audio content to distributed group communications.

To illustrate operation of a non-limiting example of a distributed group communication system utilizing supplemental audio content, FIG. 1 illustrates distributed communication system 100 in which communication amongst and between communication user nodes 110 as members of a defined communication group 104 is enabled via a communication application 116 executing within each node and a group communication service 150 (which can be implemented in various ways, virtually and/or physically, such as a datacenter, one or more servers, software, a computing system, a private network, and/or a combination of these types of implementations). The communication application 116 in each user node 110 is configured to provide users with a user interface that permits transmitting and receiving audio communications between users in a bi-directional manner As described in connection with non-limiting examples, each node may be a single communication device or may be a multi-component system that enables user communication.

Nodes 110 are connected to group communication service 150 via communication links 108, which can be any suitable hardware, software or combination of both that provides connectivity and other required functionalities for system 100. In some implementations the nodes 110 communicate with one another via links 108, while in other implementations the nodes 110 may communicate directly with one another via other appropriate links 109. Group communication service 150 can include application programming interface (API) servers 152 and transport servers 154, as well as any other servers and other equipment needed to implement the distributed group communication system.

In some embodiments, the API servers 152 can provide functionality for user-visible events and actions (e.g., search for contacts or groups, create new groups, read current member list and other group data, unsubscribe from a group, read current user contact list, add or remove contacts, create new users, and user login/logout). In some embodiments, the API servers 152 can handle the event streams which represent group/channel events (e.g., push-to-talk (PTT) events, changes to group membership, geolocation updates, and changes to user statuses). Service 150 also can be configured to enable and facilitate communications between members (e.g., registering group members, collecting user and communication device data, configuring communication devices, configuring communication applications).

Exemplary operation of system 100 is illustrated in FIG. 1, one operational sequence of which is designated by the reference letters (A) through (E), but note that these and/or other steps could be performed in any order in various implementations. One or more members of group 104 wish to have audio content added to supplement their bidirectional communications with group 104. The audio content can be merged with user communications (e.g., by treating the supplemental audio content stream as an additional node in the communication group). A request for audio content is received (A) by service 150. The audio content request may be generated by a single member 110 of group 104 or may be generated by group 104 as a whole (e.g., by having each member 110 approve a proposed request that is sent only after all members, or all active members, have agreed to the request).

Service 150 thereafter spawns (B) a communication bot node 160 with instructions to locate an appropriate audio content source. Bot node 160 can be instantiated (physically and/or virtually) inside group communication service 150 or can be configured as a bot node in some other way. Bot node 160 locates (C) the audio content source 170 and then unidirectionally delivers the requested audio content (D) to service 150. The delivered unidirectional (i.e., incoming received broadcast only that is transmitted on to the user nodes) audio content is then merged (E) into the bidirectional communications being transmitted and received by user nodes 110.

The supplemental audio content from source 170 can be one or more types of audio content. For example, in some implementations the bot node 160 may obtain an audio stream or other content from a website. In other cases the audio content can be obtained from a private audio content file. In yet other situation the audio content may be a live audio feed or other real-time audio content that is being broadcast or transmitted in some way.

Merging audio content supplied to communication group 104 by service 150 can be performed in various ways. In some implementations service 150 adds bot node 160's unidirectional flow of audio content as another user node member of group 104. In other implementations (e.g., where user nodes 110 are able to communicate directly), the audio content flow is provided to a communication application in each user node 110 and that application merges user communications with the requested audio content. Other implementations may similarly be utilized. In some implementations the audio content is mixed with users' communications so that the audio content is always heard. In other implementations the audio content can be provided only when user communications are not being transmitted (i.e., the audio content "cuts out" when users are communicating).

Figure 2:
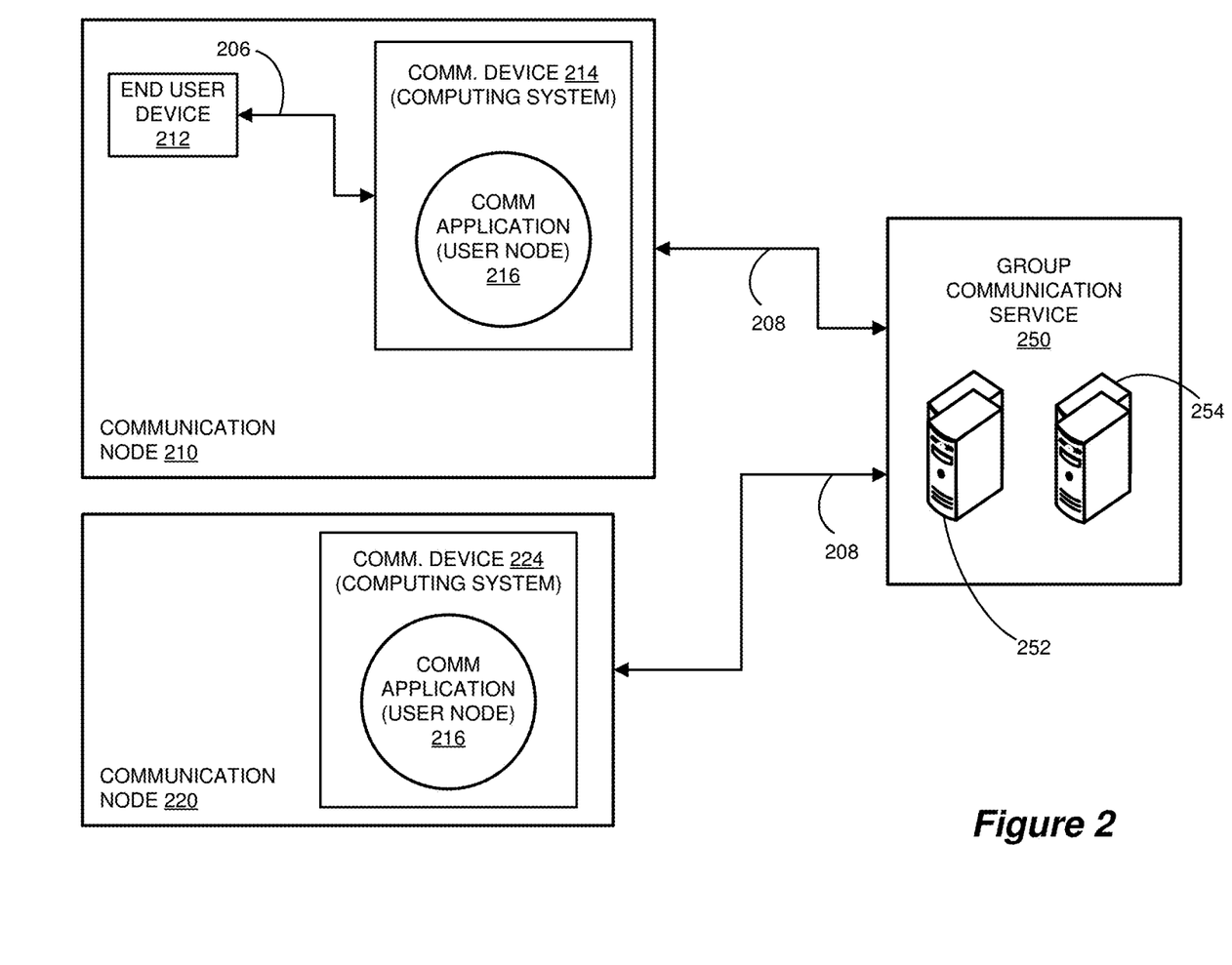
FIG. 2 illustrates exemplary communication nodes in a distributed group communication system.

FIG. 2 illustrates at least two different user node implementations that can be employed in connection with a distributed group communication system utilizing supplemental audio content. User node 210 comprises an end user device 212 (e.g., a wearable end user device that operates as a push-to-talk (PTT) device) that is communicatively linked to an intermediate communication device 214 using link 206. End user device 212 may comprise a speaker, microphone, processing system, communication interface, and a user interface to provide communications over intermediate communication device 214 to group communication service 150 and other end user devices. In operation, end user device 212 can be configured to allow an end user to communicate with one or more members of a group and/or group communication service 250 via communication links 208 without having to provide user input to intermediate communication device 214. End user devices may be required to provide authentication and/or other information to link to their respective intermediate communication devices, after which a user can utilize a linked end user device to communicate directly with other members of a group.

A second illustrative, non-limiting example illustrates personal communication node software within an operating environment of an electronic device 224, wherein the electronic device may comprise a smartphone, tablet device, computer, gaming device, laptop computer, or some other communication device capable of communicating using packet networks or some other communication network, running a personal communication node software application 216 that comprises personal communication node 220.

Figure 3:
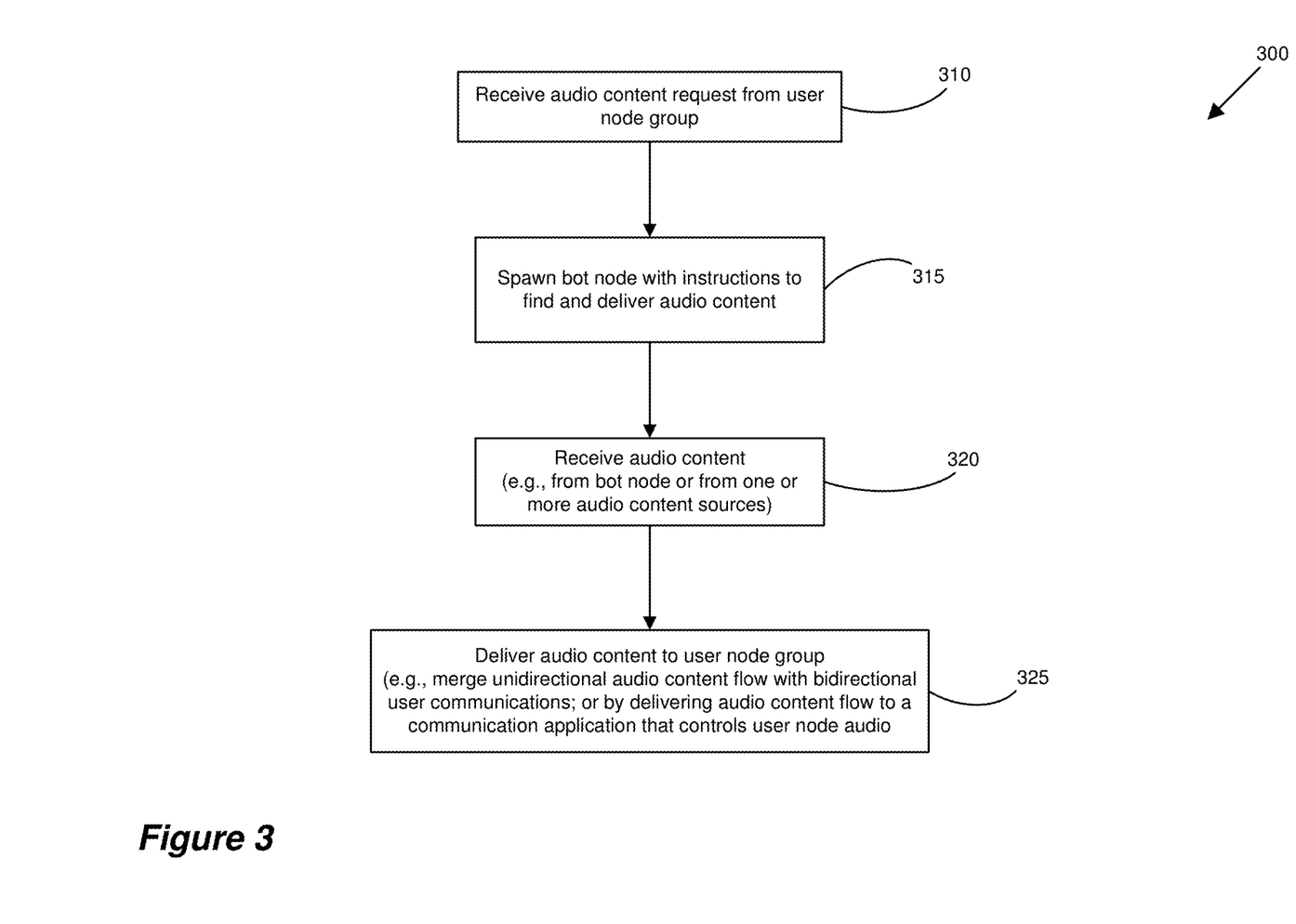
FIG. 3 illustrates one or more methods of operating a communication system.

Referring to FIG. 3, a method 300 of merging supplemental audio content with user node communications in a distributed group communication environment is shown. Method 300 is described with reference to exemplary elements, apparatus, systems and other information from FIG. 1. The description below references operations of FIG. 3 parenthetically.

As described in connection with FIG. 1, a user node group 104 is established, enabling secure communications among and between user nodes 110 as members of group 104. A group communication service 150 receives (310) a request for audio content from group 104. The request may be from an individual member user node 110 of group 104 or may be in the form of a collective request from the group 104. Upon receiving the request, service 150 spawns (315) a bot node 160 that is provided with instructions for locating and delivering the requested audio content. In some implementations the instructions to find the requested audio content may include a universal resource locator (URL) at which the audio content can be obtained, or may provide sufficient descriptive information to allow the bot node 160 to search for the audio content. In some implementations the requested audio content may be delivered to user nodes 110 via the group communication service 150 or it may be delivered directly to the group's user nodes 110. In FIG. 3 the requested audio content is received (320) by service 150. Delivery (325) of the requested audio content from service 150 to user nodes 110 can be accomplished by providing the audio content in a steady, unidirectional flow to user nodes 110 by merging the unidirectional audio content flow with user bidirectional communications, for example by treating bot node 160 as another user node member of the communication group 104. This merger of audio can be performed by the group communication service 150 or can be performed by the communication application 116 being executed in each user node 110.

Figure 4:
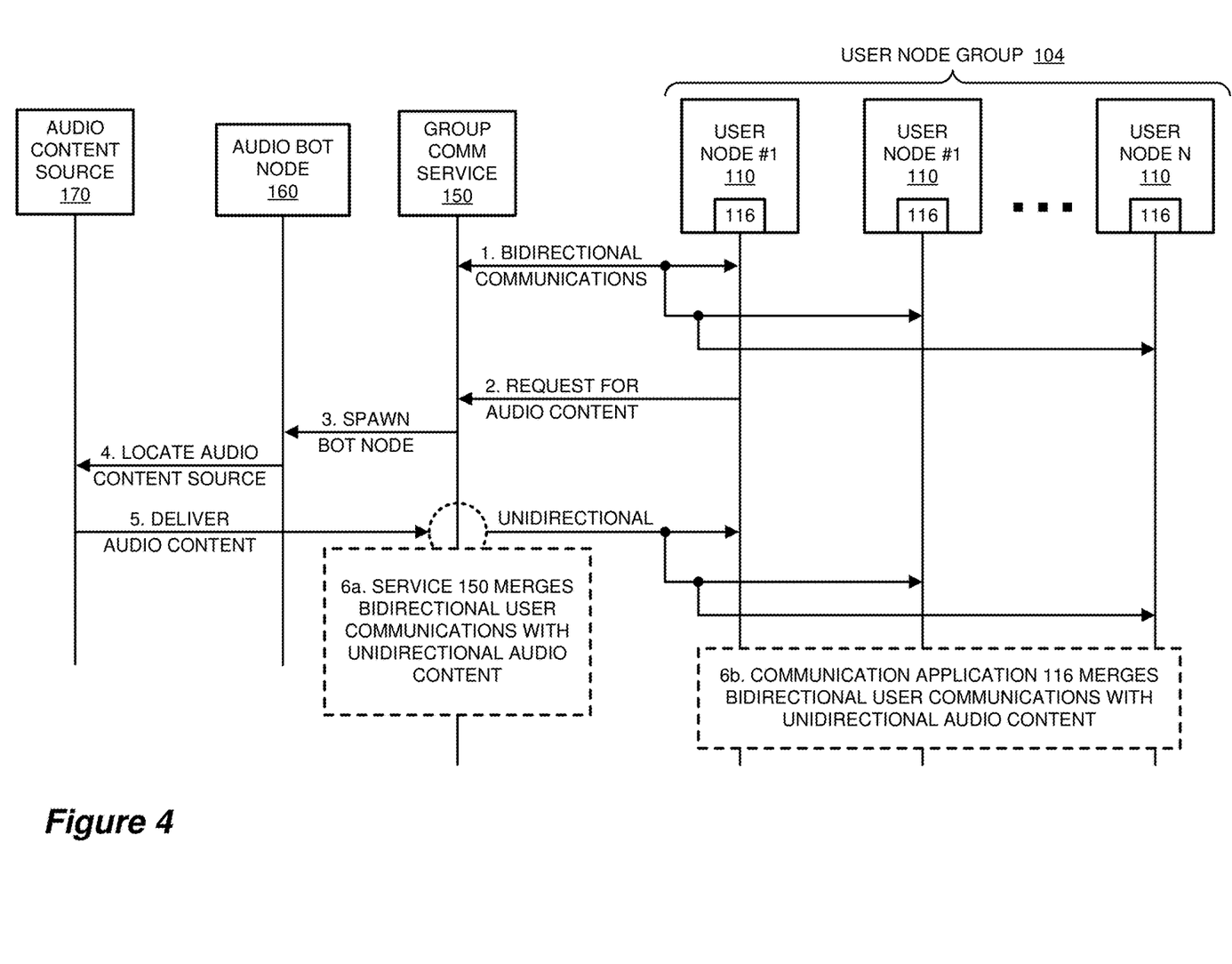
FIG. 4 illustrates a sequence diagram depicting providing supplemental audio content to distributed group communications.

FIG. 4 illustrates a sequence diagram depicting exemplary supplemental audio content deployment to a group containing multiple communication user nodes in a distributed group communication system 100 as depicted in FIG. 1. Specifically, the exemplary process of FIG. 4 depicts use of an audio bot node 160 that is spawned after a user request for audio content and which locates and delivers audio content to the user node group 104.

To begin, at step 1 user node members 110 of group 104 are able to transmit and receive communications to and from other group members. In some implementations these bidirectional communications are channeled through group communication service 150 or the like. A request for audio content is received by the group communication service 150 at step 2—that request may be generated by a single member 110 of group 104 or may be generated by group 104 as a whole (e.g., by having each member 110 approve a proposed request that is sent only after all members, or all active members, have agreed to the request).

In response to the request, group communication service 150 spawns an audio bot node 160 at step 3. Bot node 160 is programmed or otherwise configured to locate the requested content at step 4. To aid the bot node 160 in locating responsive audio content, the user node group request and/or the bot node spawning may provide a URL and/or other identifying data that tells the bot node where to locate the requested audio content's source 170. In some implementations the bot node 160 may have some search or other decision-making capabilities and may be equipped with any permissions, passwords and/or other authentication information needed to access the requested audio content source 170 and its contents. When the bot node 160 has located the audio content, the content is delivered at step 5 to user node group 104 (e.g., via group communication service 150 or directly).

In implementations where user communications are to include the audio content, the unidirectional audio content can be merged with the bidirectional user communication audio either at the group communication service 150 (step 6a) or by a communication application 116 being executed in each user node 110 (step 6b). Similarly, if users do not want the unidirectional audio content flow to be merged with their communications, then a user in some implementations can "opt out" of the supplemental audio content.

Figure 5A:
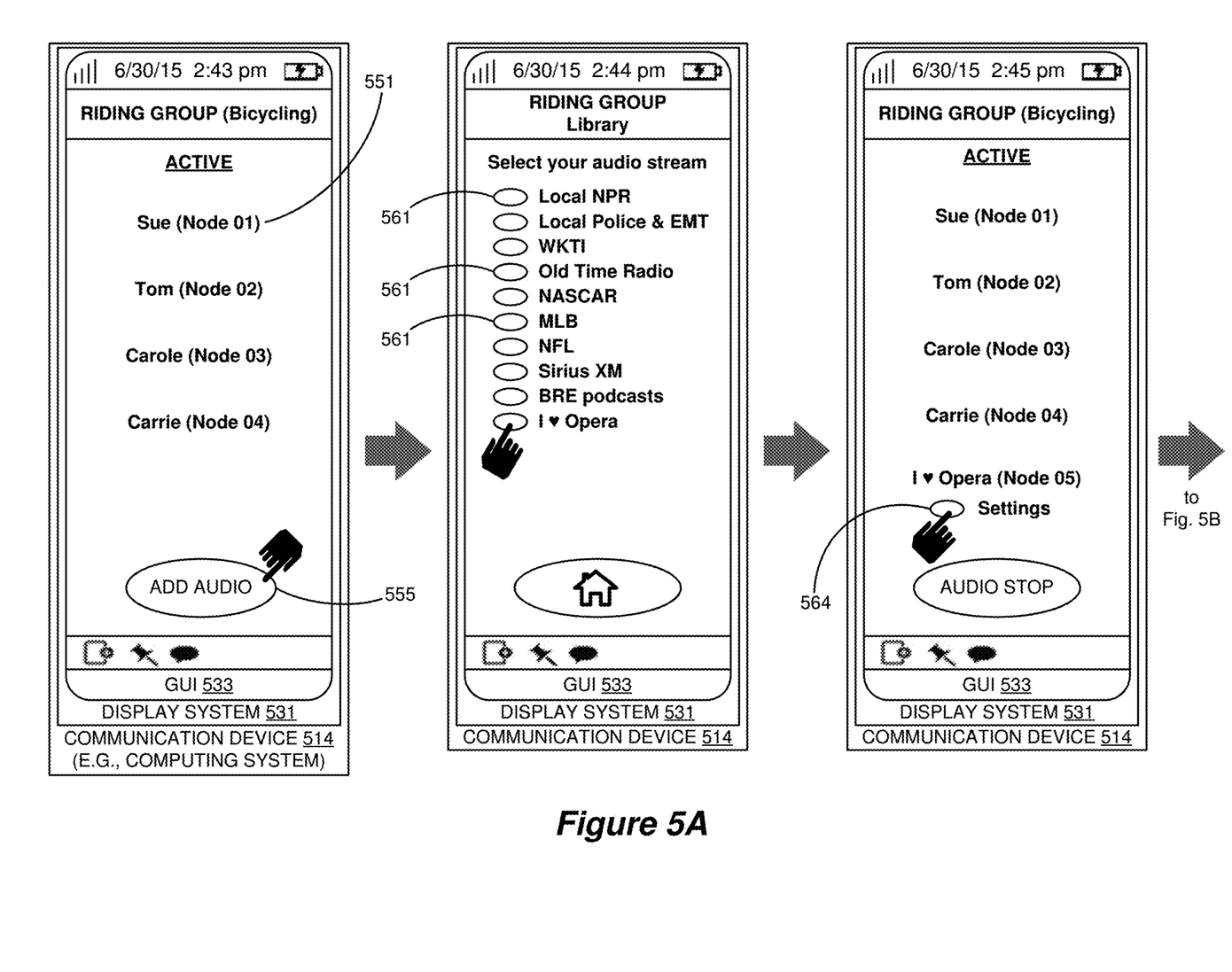
FIG. 5A is a block diagram that illustrates an operational scenario of a communication device in an exemplary implementation.
Figure 5B:
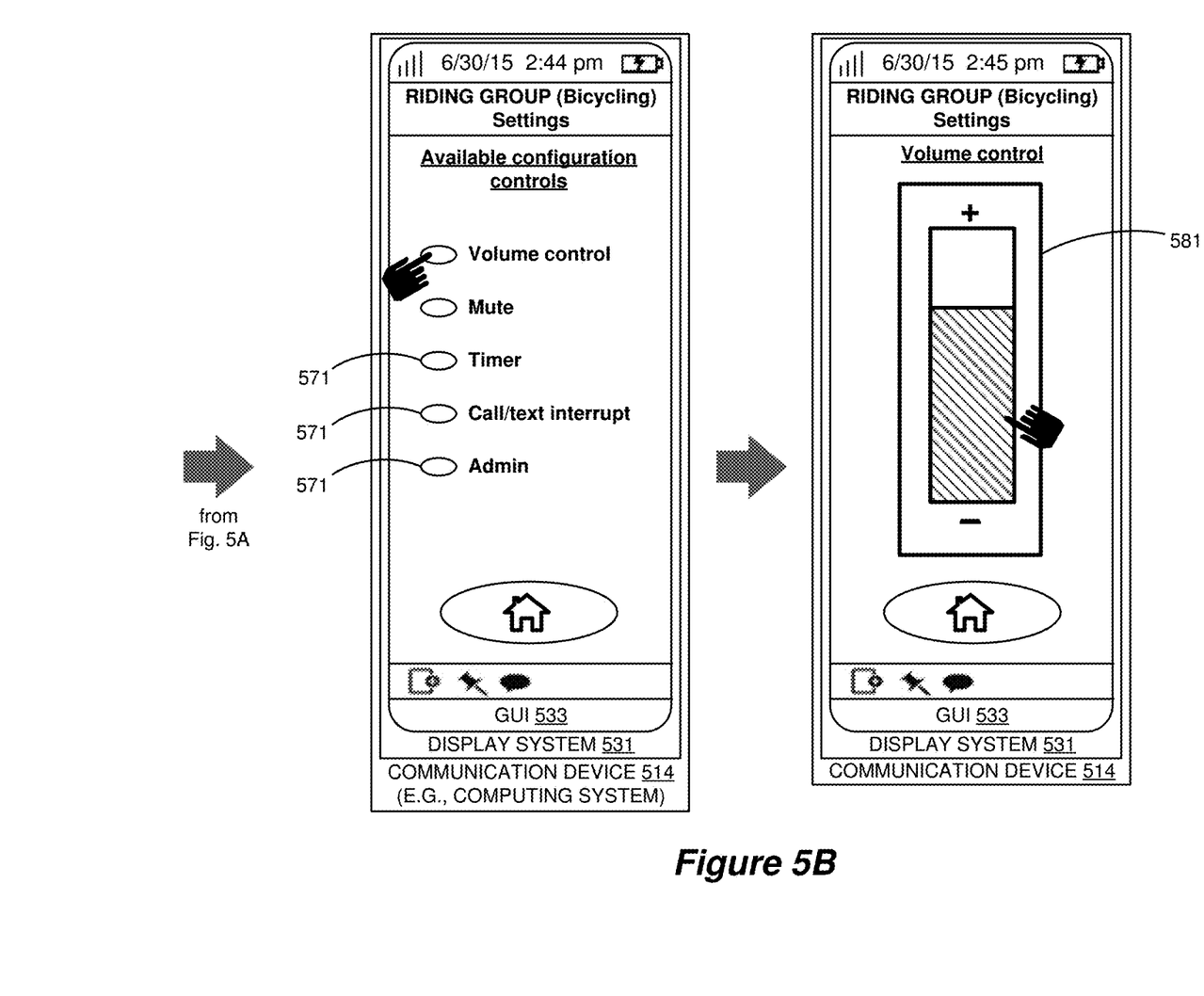
FIG. 5B is a block diagram that illustrates an operational scenario of a communication device in an exemplary implementation.

FIGS. 5A and 5B illustrate one or more implementations of distributed group communication system utilizing supplemental audio content in which a display system 531 of a communication device 514 (e.g., an intermediate communication device such as a smartphone, cellphone, gaming device, tablet, or laptop) is utilized to provide a user interface 533 (e.g., a graphical user interface (GUI)) with which a user can provide instructions handling audio content that is available to be merged with a communication group's user communications. A roster of active group members can include each member's name 551 (and any other identifying data for a particular user node 110). When a user (or the group) wishes to add audio to the group's communications, the "ADD AUDIO" button 555 can be tapped on GUI 533. The user may then be presented with a library, menu or other selection display. To the extent that desired audio content requires permissions, fees or other permissions, authorizations or the like, a communication application running on communication device 514 can be configured to display only those audio content sources to which the relevant group is allowed access.

Various selection buttons 561 can be presented on GUI 533. In some cases (e.g., with regard to a sports league or other multi-broadcast source), tapping on a given selection may lead to a secondary menu of selections within the original heading. After the selection is made, the bot node 160 is spawned and audio content is delivered to the group members. As seen in FIG. 5A, the bot node (e.g., "opera node 05") can provide a settings button 564 to permit user configuration options with regard to the audio content generally and audio content being delivered specifically to one communication device 514. Tapping button 564 can cause a communication application running on device 514 to offer configuration controls 571 to the user, as seen in FIG. 5B. Tapping on a control can give the user the option, for example, to adjust volume setting using an easily adjusted graphic 581.

Several non-limiting examples assist in providing potential uses of supplemental audio content in a distributed group communication system. If the user group is a collection of riders who bicycle together (e.g., either for recreation or in training for racing), the users can select music and/or other supplemental audio content that is "background" for communications during rides (e.g., the audio content being "acoustic wallpaper" for the activity). Some users may wish to mute the audio content stream at times, which can be implemented as an optional feature of some implementations. In another example, a group may be watching a widely viewable event such as fireworks to which an FM radio station or other service has provided a musical accompaniment. The group can utilize supplemental audio content for their distributed group communications during the viewable event.

At a sporting event such as an auto race or football game, contestants in the competition (e.g., pit crew members, drivers, players on the field) may be "mic'd up" so that their exchanges with team members and other utterance (as well as event sounds) can be broadcast. A group that is attending the event, but not sitting together can nevertheless share comments, observations, etc. while listening to contestants.

Beyond entertainment, implementations of supplemental audio content in a distributed group communication system can include fire and rescue operations over a wide area, including combatting forest fires and the like. Users can be linked together for sharing user node communications, while also receiving live feeds of rescue and/or other communication channels that provide instructions, up-to-date status reports and other useful information.

Figure 6:
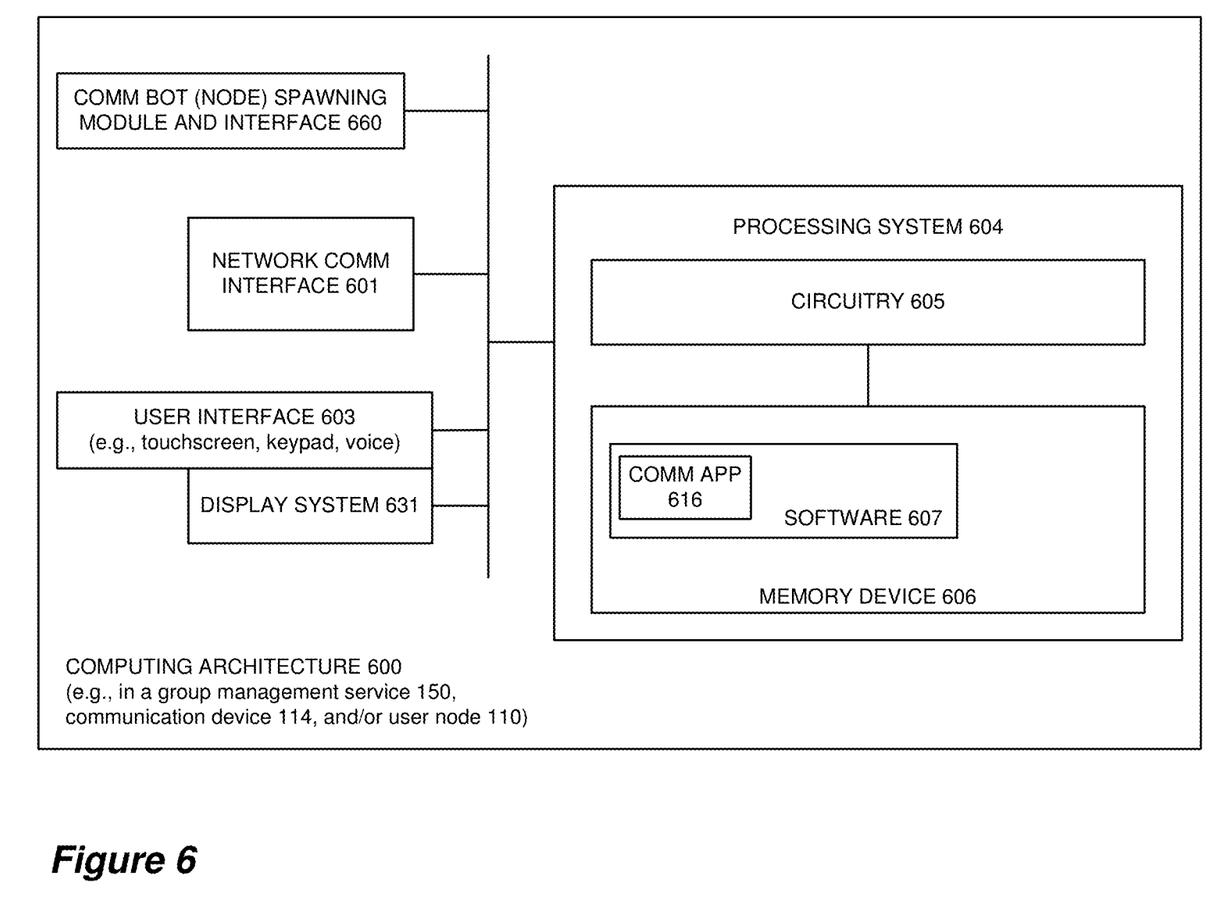
FIG. 6 illustrates a computing architecture to provide supplemental audio content to distributed group communications.

FIG. 6 illustrates a computing architecture 600 to implement the communication systems, devices, apparatus and processes in FIGS. 1-5B, including without limitation as a group communication service 150, a user node 110, and/or a communication device 114. Computing architecture 600 is representative of a computing architecture that may be employed as any computing apparatus, system, or device, or collections thereof, to suitably implement one or more of the systems, devices, apparatus and processes in FIGS. 1-5B. Computing architecture 600 comprises network communication interface 601, user interface 603, and processing system 604. Processing system 604 is communicatively linked to communication interface 601 and user interface 603. Processing system 604 includes processing circuitry 605 and memory device 606 that stores operating software 607 (including communication application 616).

Network communication interface 601 comprises components that communicate over network and related communication links (e.g., including those extending outside a communication node), such as network cards, ports, RF transceivers, processing circuitry and software, or some other communication devices. Network communication interface 601 may be configured to communicate over metallic, wireless, or optical links. Network communication interface 601 also may be configured to use TDM, IP, Ethernet, optical networking, wireless protocols, communication signaling, or some other communication format—including combinations thereof. User interface 603 comprises components that permit user interaction with computing architecture 600. User interface 603 can include a keyboard, display screen, touchscreen, mouse, touch pad, and/or other user input/output apparatus. User interface 603 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 may include any number of software modules to provide the communication operations described herein. Operating software 607 may further include an operating system, utilities, drivers, network interfaces, applications, or some other type of software. When executed by circuitry 605, operating software 607 directs processing system 604 to operate computing architecture 600 as described herein to provide low energy audio streaming and other communications.

In some implementations, the communication systems can make recordings of voice or other acoustic signals and send those discrete recordings out to communication group members. An audio bot can operate in a similar fashion. For example, a radio station could write a micro-service to which members can subscribe (e.g., having a micro-service in a given entity's data center). An audio bot can then bump out the station's audio content in recordings. Alternatively, an audio bot could stream audio content to group members (in contract to a recordings-mode distribution of the audio content). Instead of relatively discrete packages of audio content, user nodes are set up with the stream. A user can interrupt the stream by pressing a PTT button and talking, for example. In some implementations a stream can be a separate channel (e.g., using IP links, many channels can be made available). Audio can thus continue to play "in the background" (perhaps at a lower volume level) and allow users to communicate over the audio. This type of merging of the audio content with the user communications would not require mixing, per se, but instead would be two channels playing out on the same endpoint nodes. In some implementations the audio bot collects the audio content and delivers it to the group communication service marked for distribution to a given user group.

Figure 7A:
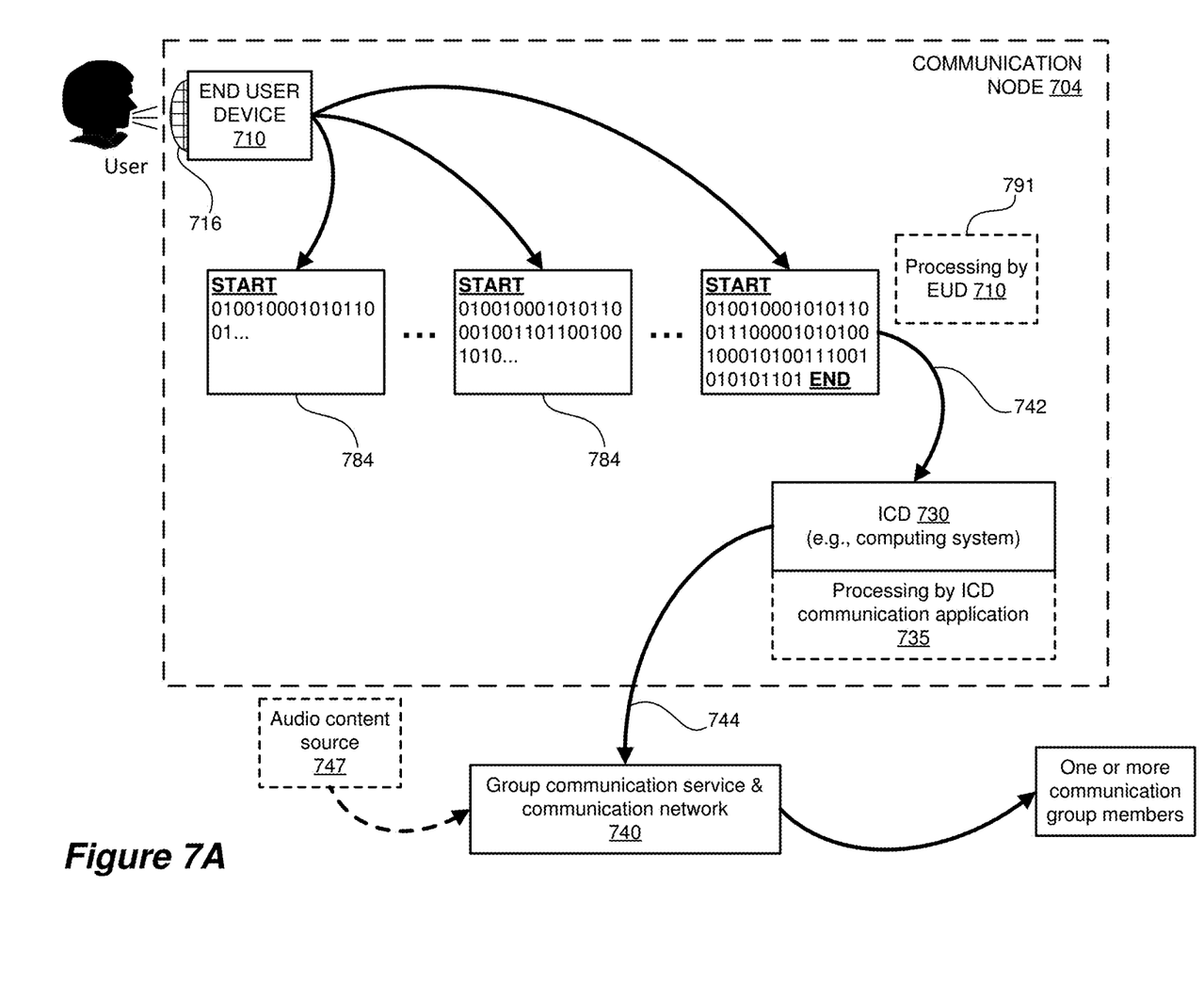
FIG. 7A illustrates communications between an end user device and an intermediate communication device.

In some implementations, each end user device can be implemented in a half-duplex type of operational mode. That is, a device in a communication node linked to a communication group or the like can transmit and receive, but cannot do both at the same time. A "push-to-talk" operational mode allows an end user to press a transmit toggle button or the like (e.g., by pushing and holding a toggle) to initiate sending a voice communication to one or more users in the communication group. While the toggle is in its "transmit" position, an end user device is configured to collect audio data from the user (e.g., recording voice communications). This can be done in a variety of ways. The collected audio data can be held in the end user device or in a linked intermediate communication device (e.g., a smartphone, cellphone, gaming device, tablet, or laptop). When the toggle is switched back to its "receive" position, any collected audio data is transmitted to the one or more communication group members. The collected audio data can be transmitted using any appropriate transmission scheme. In one non-limiting example discussed below, audio data collected by an end user device can be transmitted to its linked intermediate communication device via one of the Bluetooth modes. Likewise, audio data collected by an intermediate communication device can be send over a broader network using any appropriate communication protocol or scheme. As disclosed and discussed herein, audio content brought in to group communications via a bot node or the like can be combined with user communications in any suitable manner In one implementation, a non-limiting example of which is illustrated in FIG. 7A, a communication node 704 includes an end user device 710 that has a microphone 716 configured to collect audio data from a human user. As illustrated in FIG. 7A, the end user device 710 begins storing the collected audio data in a memory location 784. This audio data collection process continues until the a push-to-talk button on end user device 710 is released (i.e., the END signal in FIG. 7A). Some additional processing 791 may be performed by end user device 710 before the collected audio data is transmitted at 742 to an intermediate communication device 730 that also is part of communication node 704. Again, some additional processing 735 may be performed by ICD 730 before it transmits at 744 the audio data to one or more additional communication group members via group communication service and communication network 740. Audio content from audio content source 747 can likewise be delivered to group communication service and network 740. In some implementations, multiple members of a group can be collecting audio data, though while an EUD 710 or the like is collecting such audio data (i.e., while the push-to-talk button is in its transmit position) the ICD 730 and/or EUD 710 cannot play back audio data received from another user.

Figure 7B:
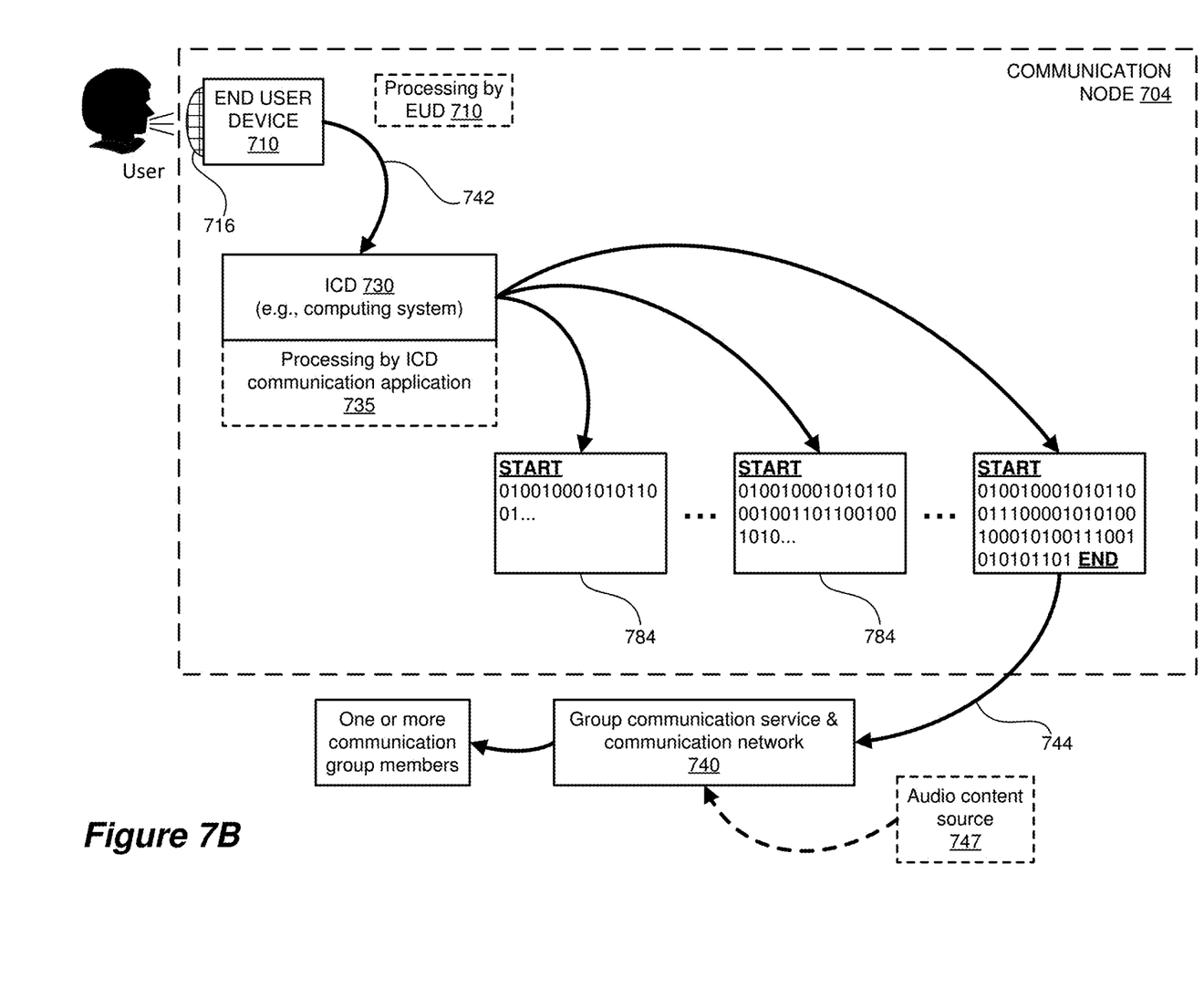
FIG. 7B illustrates communications between an end user device and an intermediate communication device.

In another non-limiting example shown in FIG. 7B, it is the intermediate communication device 730 that stores the collected audio data before it is transmitted via service and network 740. The end user device 710 may process audio data collected from a user prior to transmission at 743 to the ICD 730 (e.g., the collected audio data may be encrypted, buffered to permit error correction, assembled into packets, etc.). The intermediate communication device 730 builds the audio data until the push-to-talk button on the EUD 710 is switched back to receive, at which point the ICD 730 can transmit the collected audio data to group communication service and network 740 and thus to one or more communication group members or the like.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   operating a group communication system configured to manage audio communications between user nodes in a communication group, including:
      receiving, at the group communication system, an audio content request from a user node in the communication group;
      launching, at the group communication system based on the audio content request, a bot node as a member of the communication group to deliver audio content from an audio content source to the group communication system;
      receiving, at the group communication system, audio content from the audio content source via the bot node; and
      delivering, from the group communication system, the received audio content to one or more user nodes of the communication group, including merging the received audio content with member node communications by mixing the received audio content and user communications.

2. The method of claim 1 wherein delivering the received audio content comprises merging the received audio content with member user node communications by adding the audio content as a member node audio stream to the communication group.

3. The method of claim 1 wherein user nodes in the communication group each comprises an end user device wirelessly linked to an intermediate communication device.

4. The method of claim 3 wherein each end user device comprises a wearable push-to-talk device.

5. The method of claim 1 wherein the user nodes in the communication group each comprises a communication device executing a communication application.

6. The method of claim 5 wherein each communication device is one of the following:
   a cellphone;
   a smartphone;
   a gaming device;
   a tablet computer;
   a laptop computer.

7. The method of claim 1 wherein the received audio content comprises one of the following:
   a live audio feed;
   audio content from a website;
   audio content from a private audio content file.

8. A memory device storing instructions, which when executed, cause a processor to:
   execute a communication group management system to manage audio communications between user nodes in a communication group, including:
      receive an audio content request from a user node of the communication group;
      in response to the audio content request, launch a bot node configured to deliver audio content from an audio content source to the communication group management system;
      receive audio content from the audio content source via the bot node; and
      deliver the received audio content to one or more user nodes of the communication group, including merging the received audio content with member node communications by mixing the received audio content and user communications.

9. The memory device of claim 8, wherein the instructions, when executed by the processor, further cause the communication group management system to merge the received audio content with member user node communications by adding the audio content as a member node audio stream to the communication group.

10. The memory device of claim 9, wherein the instructions, when executed by the processor, further cause the communication group management system to:
    receive an indication from a particular user node in the communication group to opt out of receiving the received audio content; and
    do not merge the received audio content with member user node communications for the particular user node, based on the indication.

11. The memory device of claim 8 wherein a user node in the communication group comprises an end user device wirelessly linked to an intermediate communication device.

12. The memory device of claim 11 wherein each end user device comprises a wearable push-to-talk device.

13. The memory device of claim 8 wherein the received audio content is delivered to the one or more user nodes on a separate channel from communications between user nodes, to enable continuous play of the received audio content on user nodes without interrupting group communications.

14. The memory device of claim 8 wherein a user node in the communication group includes a communication device from among the following:
    a cellphone;
    a smartphone;
    a gaming device;
    a tablet computer;
    a laptop computer.

15. The memory device of claim 8 wherein the received audio content comprises one of the following:
    a live audio feed;
    audio content from a website;
    audio content from a private audio content file.

16. An apparatus comprising:
    a processor;

a memory storing instructions that cause the processor to implement a group communication management system configured to manage audio communications between user nodes in a communication group, including:
- receive an audio content request from a first user node of the communication group;
- in response to the audio content request, launch a bot node configured to deliver a unidirectional audio stream comprising audio content from an audio content source to the group communication management system;
- receive audio content from the audio content source via the bot node; and
- distribute the received audio content to one or more user nodes in the communication group, including merging the received audio content with member node communications by mixing the received audio content and user communications.

17. The apparatus of claim 16 wherein the audio content request comprises audio content configuration data from a communication group user node interface.

18. The apparatus of claim 16 wherein distributing the received audio content comprises:
- adding the bot node as a member node of the communication group; and
- sending the received audio content to user nodes in the communication group as a group communication from a member node.

19. The apparatus of claim 16 wherein the received audio content is distributed to the one or more user nodes on a separate channel from communications between user nodes, to enable continuous play of the received audio content on user nodes without interrupting group communications.

20. The apparatus of claim 16 wherein the processor implements the group communication management system, further including:
- receive an indication from a second user node in the communication group to opt out of receiving the received audio content; and
- do not distribute the received audio content to the second user node based on the indication.

* * * * *